Jan. 7, 1941.　　　　L. R. CAMPBELL　　　　2,227,486
WELDING DEVICE
Filed Aug. 29, 1938　　　　2 Sheets-Sheet 1
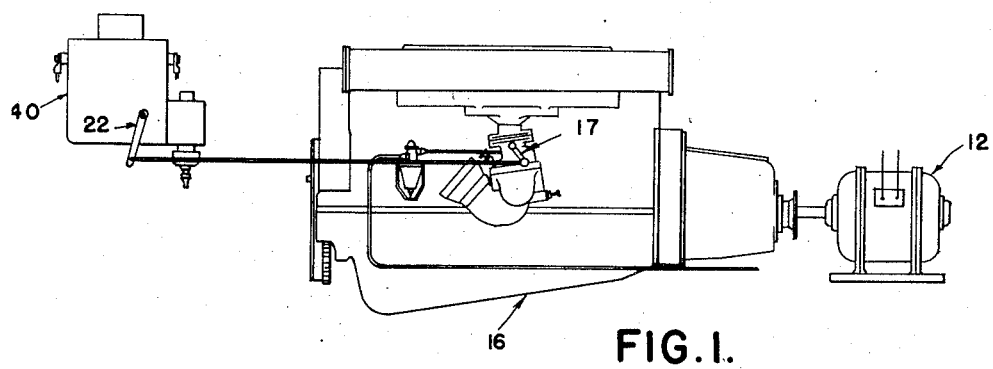
FIG. I.
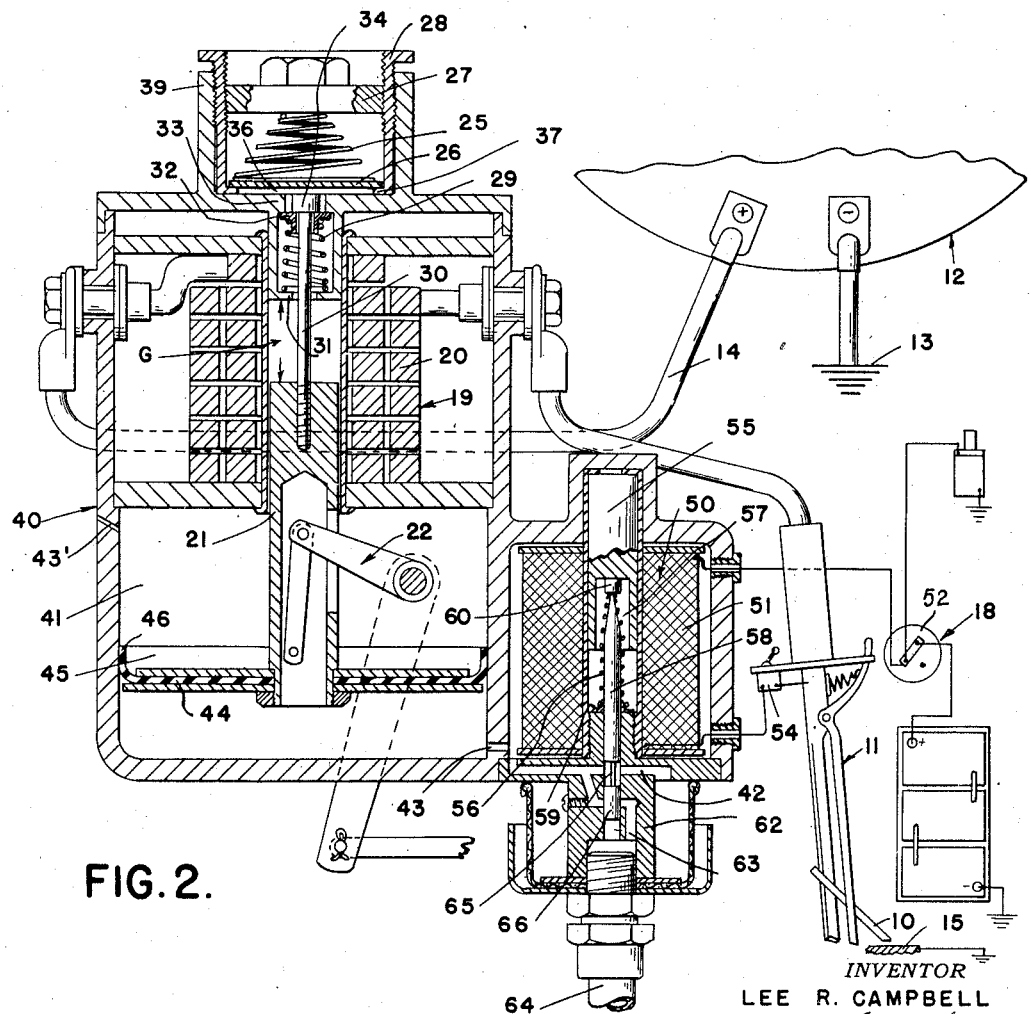
FIG. 2.
INVENTOR
LEE R. CAMPBELL
ATTORNEYS

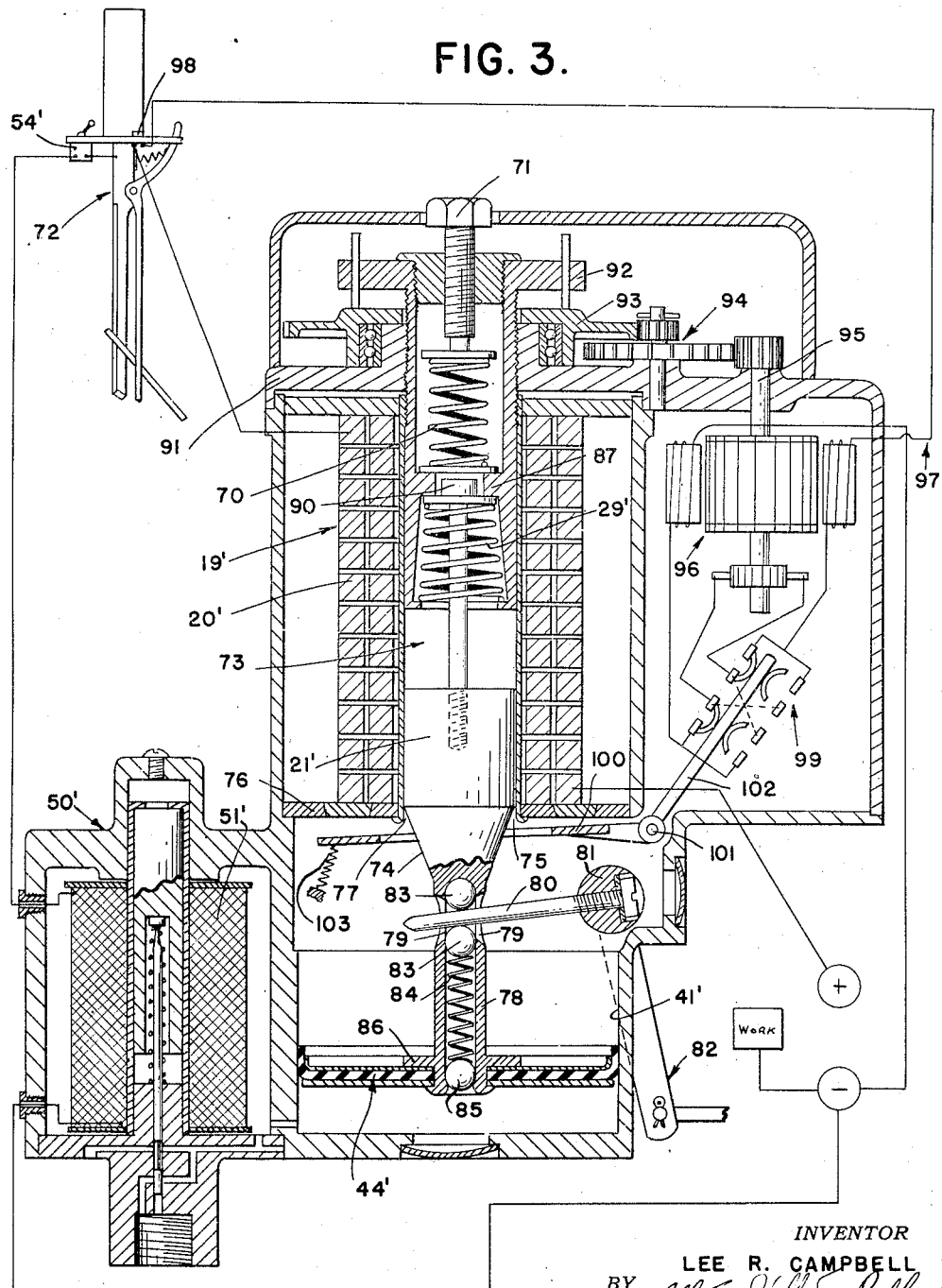

UNITED STATES PATENT OFFICE 2,227,486

WELDING DEVICE

Lee R. Campbell, Hazel Park, Mich.

Application August 29, 1938, Serial No. 227,406

17 Claims. (Cl. 290—40)

This invention relates generally to electric welders and refers more particularly to welding equipment of the type employing a motor generator set to supply the electrical energy required for the weld.

It is one of the principal objects of this invention to provide means for accurately controlling the generator output by regulating the speed of the prime mover in dependence upon variations in the load, or in accordance with the amount of electrical energy necessary to perform the required work.

Another object of this invention consists in the provision of welding equipment having an internal combustion engine coupled to the generator and having means responsive to the demands of electrical energy at the work for operating the throttle of the engine to regulate the speed of the engine.

Still another feature of the present invention resides in the provision of an electromagnet having a movable core operatively connected to the speed control means for the prime mover and having a coil electrically connected in series with the welding circuit in such a manner that the strength of the magnetic circuit through the core varies in accordance with changes in the load. By reason of this construction, the speed of the prime mover and the output of the generator supplying electrical energy to the welding circuit are automatically varied to compensate for changes in the load.

Still another object of this invention resides in the provision of welding equipment of the type previously set forth embodying means effective to compensate for variations in the size of the gap in the magnetic circuit, resulting from movement of the throttle control core, so that the strength of this circuit will be substantially uniform. By virtue of this arrangement, the core, or throttle, is responsive solely to load variations and, as a result, more accurate performance is realized.

A further feature of this invention consists in the provision of welding equipment of the type set forth in the preceding paragraph having means effective after a predetermined movement of the throttle toward its open position to yieldably resist further opening of the throttle with a force predetermined in dependence upon the resistance set up in the circuit by the particular electrode selected.

A further advantageous feature of this invention consists in the provision of welding equipment having means preventing surging or overcontrolling of the generator output during the welding operation by applying a stabilizing action on the throttle control as the latter is moved toward its open position.

A still further feature of this invention consists in the provision of means under the control of the operator for adjusting the core to increase or decrease the generator output.

In addition to the foregoing, the present invention contemplates electrical welding equipment having a portable electrode holding device and having means conveniently located on the device for manipulation by the operator to control the operation of the equipment.

The foregoing, as well as other objects, will be made more apparent as this description proceeds, especially when considered in connection with the accompanying drawings, wherein:

Figure 1 is a semi-diagrammatic elevational view of welding equipment constructed in accordance with this invention and showing several of the parts in section for the sake of clearness;

Figure 2 is an enlarged sectional view of a portion of the construction shown in Figure 1; and Figure 3 is a vertical sectional view through a modified form of construction.

In Figure 2 of the drawings, it will be noted that I have illustrated electric welding equipment for an arc welder having an electrode 10 mounted in a holder 11 of the portable type and supplied with electrical energy by a generator 12, diagrammatically illustrated in Figure 1. One side of the generator is grounded at 13 and the other side is electrically connected to the electrode 10 through the medium of a conductor 14. The work 15 to be welded is also grounded in order to complete the welding circuit when the electrode 10 is supported in operative relation to the work. In welders of the above general type, the operator manipulates the electrode holder 11 in such a manner that the free end of the electrode 10 is spaced above the work 15 to provide the desired arc and the load on the generator varies in dependence upon the length of the arc and the size of the electrode.

It follows from the above that the load on the generator may vary throughout a relatively wide range and unless some provision is made for correspondingly varying the output of the generator, serious difficulty is encountered in obtaining satisfactory operation. In the present instance, the output of the generator is automatically varied in dependence upon changes in the load so that the proper amount of electrical energy is supplied at all times to the electrode 10. In accordance with the present invention, the generator 12 is driven by a variable speed prime mover and the output of the generator is varied by automatically altering the speed of the prime mover in accordance with the variations in load at the work. With this in view, attention is again directed to Figures 1 and 2 of the drawings, wherein it will be noted that the prime mover 16 is in the form of an internal combustion engine of orthodox design having a fuel induction system embodying a throttle 17 and having the conventional ignition system, designated generally by the reference character 18.

The throttle 17 is operated by an electromagnet 19 having a coil 20 and a core 21 slidably supported within the coil. The core 21 is operatively connected to the throttle through the medium of articulated linkage 22 in such a manner that movement of the core into the coil 20 opens the throttle and movement of the core in the opposite direction closes the throttle. The coil 20 is electrically connected in series with the welding circuit so that the electrical energy flowing through the coil varies in accordance with the load. This being the case, it necessarily follows that the strength of the magnetic circuit acting upon the core 21 will vary as the length of the arc and the size of the electrode vary.

With the construction as thus far described, it will be noted that when the load on the generator is increased by striking an arc with the electrode 10, the coil 20 is energized and the resulting magnetic circuit causes the core 21 to move into the coil to such an extent as to open the throttle 17 controlling the speed of the motor 16. As the speed of the motor 16 is increased, the generator output is correspondingly increased and the supply of electrical energy to the electrode 10 is likewise increased.

Although the coil 20 of the electromagnet 19 for controlling the throttle 17 is located in series with the welding circuit so that the strength of the magnetic circuit is largely dependent upon the power demand at the work, nevertheless, there is a tendency for the core 21 to move at a relatively fast rate into the coil upon initially striking an arc with the electrode 10. This is particularly true when the load is applied suddenly and is accentuated by reason of the fact that the magnetic gap G becomes less as the core 21 moves into the field or coil 20. In order to prevent this action, provision is made herein for dampening or resisting movement of the throttle to its open position. This is accomplished by a coil spring 25 having the lower end supported on an abutment plate 26 and having the upper end engaging an adjustable ring 27. In the present illustrated embodiment of the invention, the coil spring is located above the core 21 with its axis in alignment with the axis of the core and is tapered in a manner to progressively increase the resistance to movement of the core in a direction to open the throttle. In other words, the convolutions of the spring 25, adjacent the abutment plate 26, are of substantially greater dimension than the convolutions adjacent the ring 27. The strength of the spring is predetermined to insure orderly control or movement of the throttle operating core 21, irrespective of any increase in the magnetic circuit caused by decreasing the length of the gap G.

It will, of course, be understood that the strength of the spring may be adjusted by varying the position of the abutment ring 27 relative to the sleeve 28.

It follows from the above that sudden opening of the throttle 17 by the core 21 is prevented by the spring 25 and, accordingly, there is no danger of burning or otherwise jeopardizing the work by a sudden increase in generator output. It will, of course, be understood that the spring is so calibrated and adjusted that the generator output is rendered accurately responsive to variations in the arc or power required to satisfactorily perform the work. It also follows from the above construction that a decrease in the load causes the spring to act upon the upper end of the core 21 and move the same in a downward direction to reduce the speed of the motor 16. When the load is entirely removed, the spring assumes its initial position shown on Figure 1 and the throttle is returned to a position wherein the engine 16 is running at its predetermined rated speed. This latter position of the throttle is maintained by virtue of the spring 29 surrounding the reduced upper end 30 of the core with the lower end engaging a fixed abutment 31 and with the upper end engaging a washer 32 slidably mounted on the reduced upper end 30 of the core 21. The periphery of the washer is adapted to abut a fixed shoulder 33 and the central portion thereof engages an enlarged head 34 formed on the upper end of the reduced portion 30. As stated above, the spring 29 functions through the core 21 to hold the throttle 17 in a position wherein the motor 16 is running at its rated operating speed.

Referring again to Figure 2 of the drawings, it will be noted that a gap 36 is provided between the upper end of the enlargement 34 on the core 21 and the adjacent bottom surface of the spring abutment plate 26. The arrangement is such as to permit initial relatively free upward movement of the core 21 to open the throttle when the load is applied to the generator. The extent of the gap 36 is determined to provide for increasing the power output of the generator the amount necessary to compensate for core losses and any other losses inherently present in the device. This gap may be adjusted by varying the elevation of the plate 26 relative to the enlargement 34. As shown in Figure 2, the peripheral portions of the plate 26 rest upon a flange 37 extending inwardly from the lower end of the sleeve 28. The sleeve 28 is threaded within an extension 39 of the housing 40 in order to permit the desired adjustment of the gap 36. In view of the fact that the spring abutment ring 27 is threaded within the sleeve 28, it follows that the gap 36 may be varied without altering the tension of the spring 25. In other words, when it is desired to adjust the gap 36, the ring 27 may be adjusted to the same extent as the sleeve so as to maintain the space between the ring 27 and plate 26 uniform.

A further feature of the present invention consists in stabilizing the operation of the throttle by a dashpot arrangement. In this connection, it will be noted from Figure 2 that the casing 40 is provided with a cylinder 41 at the lower end communicating with the atmosphere through the medium of a restricted port 43 and vented at the top to the atmosphere by means of a passage 43'. A piston 44 is reciprocably mounted in the cylinder above the passage 43 and is secured to the lower end of the core 21. Upon reference to Figure 2, it will be noted that the piston is provided with a cup-shaped flexible washer 45 having the side edges 46 frictionally engaging the side walls of the cylinder upon upward movement of the piston and adapted to flex inwardly upon downward movement of the piston to allow the escape of air beyond the periphery of the piston. The passage 43, establishing communication between the lower end of the cylinder and atmosphere, is restricted so that upward movement of the core 21 to open the throttle is resisted not only by the spring 25, but also by the piston 44. In other words, the arrangement is such as to definitely dampen opening movement of the throttle and thereby prevent overcontrolling of the throttle or undue surging of the motor generator unit.

A still further feature of this invention consists in providing means on the electrode holder 11 for controlling the operation of the welding equipment. In general, a switch 54 is supported on the electrode holder 11 in a position to be conveniently manipulated by the operator and effective in its closed position to connect the end of the cylinder 41 below the piston 44 with the induction system of the engine 16. The resulting suction in the cylinder 41 causes instantaneous movement of the piston 44 downwardly against the action of the spring 29 and closes the throttle 17. The speed of the motor 16 is, accordingly, reduced from its rated operating speed maintained by the spring 29 to its idling speed and the generator is rendered inoperative. As will be presently set forth, manipulation of the switch 54 to open the same closes the vacuum supply and vents the cylinder 41 to the atmosphere permitting the spring 29 to open the throttle to a position wherein the motor 16 is running at its rated operating speed.

In detail, the switch 54 is in parallel with the ignition circuit 18 and controls an electromagnet 50 having a coil 51 connected in series with the switch 54. The electromagnet 50 is rendered responsive to the switch 54 by the usual ignition switch 52 shown in Figure 2 as arranged in series with the ignition circuit. The electromagnet 50 is also provided with a core 55 responsive to excitation of the coil 51 to move downwardly into the coil against the action of the spring 56 located within a recess 57 in the core 55 and surrounding the upper end of a valve plunger 58 extending into the recess 57. In the present instance, the lower end of the spring rests on a fixed abutment 59 and the upper end of the spring engages an enlargement 60 formed on the top of the valve plunger 58. As a result, the valve plunger is compelled to follow the movements of the core 55.

The lower end of the valve plunger is slidably supported by the valve body 62 and, when in its lowermost position, closes the restricted passage 42 extending from the bottom of the cylinder 41 to the atmosphere. The valve plunger 58 is moved to the above position against the action of the spring 56 by movement of the core 55 downwardly into the coil 51 and the latter result is effected by closing the switch 54 to excite the coil 51. The valve plunger also controls a bypass 63 establishing communication between restricted passage 42 and vacuum line 64 leading to the induction manifold of the engine 16. As shown in Figure 2, the plunger is provided with a reduced portion 65 adjacent the lower end effective to establish communication through the by-pass when the restricted passage 42 is closed by the plunger. In the aforesaid position of the valve plunger 58, a vacuum pull is exerted on the piston 44 in the cylinder 41 and the throttle 17 is held in a position wherein the engine is idling.

When it is desired to start the weld, the operator merely opens the switch 54 on the electrode holder 11. As a result, the electromagnet is de-energized and the valve plunger is moved upwardly by the spring 56 to the position shown in Figure 2 wherein the vacuum line is closed by the portion 66 of the plunger. In this latter position of the plunger, the reduced portion 65 registers with the passage 42 and vents the lower end of the cylinder 41 to the atmosphere. As a result, the spring 29 acts on the core 21 to open the throttle to the position the latter assumes when the engine is running at its rated operating speed. Further opening of the throttle due to increase in load is effected and controlled in accordance with the foregoing description to secure a uniformly strong weld.

Referring now to the embodiment of the invention illustrated in Figure 3, it will be noted that in this construction, a straight spring 70 is substituted for the tapered spring 25 previously described, and the strength of this spring is determined by the adjustment 71 to afford the resistance to opening movement of the throttle required for the particular type of electrode employed in the holder 72. It follows from the above that the spring 70 differs from the spring 25 in that it does not compensate for variations in the length of the magnetic gap 73 and in order to accomplish this result in the construction shown in Figure 3, the following arrangement is provided. As will be observed from Figure 3, the movable core 21' of the electromagnet 19' is tapered, as at 74, and is extended through an opening 75 in a plate 76 forming a part of the magnetic circuit. The degree of taper of the portion 74 is so determined that as the length of the gap 73 is reduced, the space 77 between the tapered portion 74 of the core and side walls of the opening 75 is correspondingly increased. As a result, the magnetic circuit is maintained substantially uniform and the throttle operating core 21' is rendered accurately responsive to the control exercised thereon by the spring 70.

It will, of course, be understood that the magnetic coil 20' of the electromagnet 19' is connected in series with the welding circuit in exactly the same manner as the coil 20 in the first described form of the invention and, accordingly, the operation of the core 21' to control the throttle of the prime mover is the same in principle as the above described embodiment of the invention. However, it will be noted that the manner in which the core 21' is connected to the throttle operating linkage differs from the connection previously discussed. As shown in Figure 3, the lower end 78 of the core 21' is tubular and is provided with diametrically opposed slots 79 therethrough for receiving one end of a pin 80 having the opposite end threaded in a rock-shaft 81 and, in turn, is connected to the throttle of the engine by means of the linkage 82. The pin 80 is positioned relative to the tubular portion 78 of the core by means of a pair of balls 83 slidably supported in the tubular portion 78 on opposite sides of the pin. The lower ball is normally yieldably urged into frictional engagement with the pin 80 by means of a spring 84 seated at its lower end against a third ball 85 preferably larger in diameter than the balls 83 and secured in the bottom of the tubular portion 78 to seal the latter. It follows from the above construction that movement of the core 21' in opposite directions effects a rocking movement of the shaft 81 in opposite directions and, since the shaft 81 is connected to the throttle of the engine, the speed of the latter is increased or decreased, depending upon the direction of movement of the core. By virtue of the spring 84 acting upon the lower ball 83, it follows that any wear of the pin 80 is automatically compensated for so that there is no lost motion between the core 21' and the throttle. It may also be pointed out at this time that the extreme lower end of the tubular portion 78 of the core extends through the dashpot piston 44' and is riveted over the lower surface of this piston to clamp the latter against the flange 86 extending radially from the core 21'. The piston 44' operates in the cylinder 41' in the same manner as the piston 44 to dampen opening movement of the throttle by the core 21'.

As in the first described form of the invention, the portion of the cylinder 41' below the piston 44' is alternately connected to the intake manifold of the engine and to the atmosphere by an electromagnet 50'. The electromagnet 50' is identical to the electromagnet 50, with the exception that the coil 51' is connected across the generator circuit, instead of being controlled from the ignition circuit of the prime mover. The electromagnet 50' is controlled by a switch 54' in the same manner as in the first described form of the invention and, as stated above, this switch is conveniently positioned on the electrode holder 72 for manipulation by the operator.

The embodiment of the invention illustrated in Figure 3 differs essentially from the one previously described in that provision is made under the control of the operator for varying the generator output by adjusting the engine throttle. This is accomplished in the present instance by adjusting the spring retainer 87 in one direction or the other, depending upon whether an increase or a decrease in electrical energy is desired at the work. Attention may be called to the fact that the spring retainer 87 forms a part of the magnetic circuit of the electromagnet 19' and, in addition to supporting both the springs 70 and 29', supports the adjustment 71 for the spring 70. As a consequence, adjustment of the retainer is accomplished without altering the adjustment 71. It will, of course, be understood that the spring 29' is of sufficient strength to insure movement of the core 21' with the retainer 87 when the latter is moved upwardly from the position thereof shown in Figure 3 to open the throttle. On the other hand, when the retainer 87 is adjusted downwardly from the position thereof shown in Figure 3, the spring 70 acts upon the enlargement 90 to effect a corresponding downward movement of the core 21'.

In detail, it will be noted that the upper end of the spring retainer 87 is threaded in the top wall of the housing 91 and is provided with a radial flange 92 at the upper end thereof operatively connected to a gear 93 rotatably supported on the top wall of the housing in concentric relation to the spring retainer 87. The gear 93 is operatively connected, through suitable reduction gearing 94, to the drive shaft 95 of an electric motor 96 electrically connected in the control circuit 97. The operation of the motor 96 to effect an adjustment of the spring retainer 87 is controlled by a suitable push button switch 98 connected in series with the circuit 97 and mounted on the electrode holder 72 in a position for convenient manipulation by the operator. In the present illustrated embodiment of the invention, completing the circuit 97 by manipulation of the switch 98 effects a rotation of the spring retainer 87 in a direction to lower the core 21' and thereby decrease the speed of the prime mover. Of course, as soon as the operator releases the push button switch 98, the circuit to the electric motor is broken and further movement of the spring retainer 87 is discontinued.

It has previously been stated that provision is also made for increasing the speed of the prime mover by adjustment of the spring retainer 87 and, accordingly, some provision must be made for reversing the electric motor 96. In Figure 3, the reference character 99 indicates the reversing switch which is operated by the electromagnet 19' when a load is placed on the generator or, in other words, during the welding operation. Upon reference to Figure 3, it will be observed that an armature 100 is pivotally connected at 101 for swinging movement toward and away from the wall 76 of the electromagnet, and this armature is operatively connected to the switch 99 by means of the arm 102. With this arrangement, it will be noted that when the coil 20' of the electromagnet 19' is energized by the load on the generator, the armature 100 is attracted by the wall 76 of the electromagnet and the switch 99 is operated by the arm 102 to reverse the polarity of the motor 96. When this condition exists, manipulation of the switch 98 by the operator effects a rotation of the spring retainer 87 in the direction required to increase the speed of the prime mover. Attention is also called to the fact at this time that in the event the operator finds that the amount of electrical energy at the electrode is too high, he merely withdraws the electrode from the work and, in so doing, reduces the load on the generator to a minimum. As a consequence, the flow of electrical energy through the core 20' of the electromagnet drops to a negligible amount and the armature is moved by the spring 103 to the position shown in Figure 3, wherein the switch 99 is in a position to reverse the polarity of the motor so that the operator may reduce the speed of the prime mover by merely manipulating the push button 98.

What I claim as my invention is:

1. A motor generator set comprising a generator and a variable speed prime mover for operating the generator, a member movable in one direction to increase the speed of the prime mover, an electromagnet having a coil and having a movable core member, means electrically connecting the coil in series with the output of the generator and load on the generator to establish a magnetic circuit through the core in dependence upon the electrical energy supplied to the load, a connection between the core and first named member effective to increase the speed of the prime mover in accordance with movement of the core under the influence of the magnetic circuit, and means for resisting movement of the first named member in a direction to increase the speed of the prime mover with a force progressively increasing as the gap in the magnetic circuit through the core becomes less.

2. A motor generator set comprising a generator and a variable speed prime mover for operating the generator, a member movable in one direction to increase the speed of the prime mover, an electromagnet having a coil and having a movable core normally positioned to provide a substantial gap in the magnetic circuit, means electrically connecting the coil in series with the output of the generator and load on the generator, means operatively connecting the core to said member and effective upon energization of the coil to move the member in a direction to increase the speed of the prime mover, and a spring calibrated to resist movement of the member by the core with a force progressively increasing as the gap in the magnetic circuit through the core becomes less.

3. A motor generator set comprising a generator and a variable speed prime mover for operating the generator, a member movable in one direction to increase the speed of the prime mover and movable in the opposite direction to decrease the speed, a piston connected at one end to said member and reciprocably mounted in a cylinder, a source of vacuum, and means controlled by the operator for selectively connecting the portion of the cylinder at the opposite end of the piston to the source of vacuum supply and to the atmosphere.

4. A motor generator set comprising a generator and a prime mover for operating the generator, an electrode holder having a member movable in one direction to increase the speed of the prime mover and in the opposite direction to decrease the speed, yieldable means normally urging said member to a position wherein the prime mover is running at a predetermined speed, a piston connected to said member and reciprocably mounted in a cylinder, a source of vacuum having a pull exceeding the force exerted by the yieldable means and adapted to oppose the latter, and means selectively connecting the cylinder to the atmosphere and to said source of vacuum.

5. A motor generator set comprising a generator and an internal combustion engine for operating the generator and having an induction system including a throttle, a member movable in opposite directions and connected to the throttle of the engine to respectively open and close the latter, a piston connected to said member and reciprocably mounted in a cylinder alternately communicating with the induction system and the atmosphere at the side of the piston opposite the direction of movement of the member to open the throttle, and a valve operated from a point remote from the generator for selectively connecting the cylinder to the induction system and atmosphere.

6. A motor generator set comprising a generator and a variable speed prime mover for operating the generator, a member movable in opposite directions to respectively increase and decrease the speed of the prime mover, a piston having one end connected to said member and reciprocably mounted in a cylinder having the portion at the opposite end of the piston alternately communicating with the atmosphere and with a source of vacuum, a valve selectively connecting the end aforesaid of the cylinder to the atmosphere or source of vacuum, and an electromagnet controlled from a point remote from the generator for operating said valve.

7. A motor generator set comprising a generator, an internal combustion engine connected to the generator for operating the latter and having an ignition system and an induction system including a throttle, a member operatively connected to the throttle and movable in opposite directions to selectively open and close the throttle, a piston having one end connected to said member and reciprocably mounted in a cylinder having a portion at the opposite end of the piston alternately communicating with the induction system and with the atmosphere, a valve selectively connecting the portion aforesaid of the cylinder to the induction system and atmosphere, and an electromagnet connected in series with the ignition system and controlled by means positioned at a point remote from the generator for operating said valve.

8. A motor generator set comprising a generator and a variable speed prime mover for operating the generator, a member movable in one direction to increase the speed of the prime mover, an electromagnet having a coil and having a movable core member, means electrically connecting the coil in the output circuit of the generator in a manner to establish a magnetic circuit through the core in dependence upon the electrical energy supplied to the load, a connection between the core and first named member effective to increase the speed of the prime mover in accordance with movement of the core under the influence of the magnetic circuit, yieldable means acting on the core to dampen movement of the core under the influence of the magnetic circuit to increase the speed of the prime mover, and means accessible for manipulation at a point remote from the generator for moving the core and yieldable means as a unit independently of the magnetic circuit to vary the speed of the prime mover.

9. A motor generator set comprising a generator and a variable speed prime mover for operating the generator, a member movable in one direction to increase the speed of the prime mover, an electromagnet having a coil and having a movable core member, means electrically connecting the coil in the output circuit of the generator in a manner to establish a magnetic circuit through the core in dependence upon the electrical energy supplied to the load, a connection between the core and first named member effective to increase the speed of the prime mover in accordance with movement of the core under the influence of the magnetic circuit, a reversible motor operatively connected to the core for moving the latter in opposite directions to alternately increase and decrease the speed of the prime mover, and a reversing switch for the motor controlled by the electromagnet.

10. A motor generator set comprising a generator and a variable speed prime mover for operating the generator, a member movable in one direction to increase the speed of the prime mover, an electromagnet having a coil and having a movable core member, means electrically connecting the coil in the output circuit of the generator in a manner to establish a magnetic circuit through the core in dependence upon the electrical energy supplied to the load, a connection between the core and first named member effective to increase the speed of the prime mover in accordance with movement of the core under the influence of the magnetic circuit, a reversible motor operatively connected to the core for moving the latter in opposite directions to alternately increase and decrease the speed of the prime mover, a reversing switch for the motor controlled by the electromagnet, and means accessible for manipulation at a point remote from the generator for controlling the operation of the motor.

11. A motor generator set comprising a generator and a variable speed prime mover for operating the generator, a member movable in one direction to increase thee speed of the prime mover, an electromagnet having a coil and having a movable core member, means electrically connecting the coil in the output circuit of the generator in a manner to establish a magnetic circuit through the core in dependence upon the electrical energy supplied to the load, a connection between the core and first named member effective to increase the speed of the prime mover in accordance with movement of the core under the influence of the magnetic circuit, a retainer carrying yieldable means acting on the core to dampen movement of the core under the influence of the magnetic circuit, means carried by the retainer for adjusting the yieldable means to vary the resistance offered by the latter on the core, and means accessible for manipulation at a point remote from the generator for moving the retainer and core as a unit to vary the speed of the prime mover.

12. A motor generator set comprising a generator and a variable speed prime mover for operating the generator, a member movable in one direction to increase the speed of the prime mover, an electromagnet having a coil and having a movable core member normally positioned to provide a substantial gap in the magnetic circuit, means electrically connecting the coil to the output of the generator in a manner to establish the magnetic circuit through the core in dependence upon the electrical energy supplied to the load, a connection between the core and first named member effective to increase the speed of the prime mover in accordance with movement of the core under the influence of the magnetic circuit, and means responsive to movement of the core in a direction in increase the speed of the prime mover to compensate for the reduction of the gap in the magnetic circuit caused by such movement of the core and maintain the flow through the magnetic circuit substantially uniform.

13. A motor generator set comprising a generator and a variable speed prime mover for operating the generator, a member movable in one direction to increase the speed of the prime mover, an electromagnet having a coil and having a movable core normally positioned to provide a substantial gap in the magnetic circuit, means electrically connecting the coil in series with the output of the generator and load, means operatively connecting the core to said member and effective upon energization of the coil to move the member in a direction to increase the speed of the prime mover and reduce the size of the gap, and means responsive to movement of the core in a direction to decrease the gap aforesaid in the magnetic circuit to introduce a gap in the magnetic circuit of a size to compensate for the reduction of the first named gap.

14. A motor generator set comprising a generator and a variable speed prime mover for operating the generator, a member movable in one direction to increase the speed of the prime mover, an electromagnet having a coil and having a movable core member normally positioned to provide a substantial gap in the magnetic circuit, means electrically connecting the coil to the output of the generator in a manner to establish the magnetic circuit through the core in dependence upon the electrical energy supplied to the load, a connection between the core and first named member effective to increase the speed of the prime mover in accordance with movement of the core under the influence of the magnetic circuit, and means responsive to movement of the core in a direction to increase the speed of the prime mover to provide a gap in the magnetic circuit and to increase the size of this latter gap in proportion to the decrease in size of the first named gap resulting from movement of the core in the aforesaid direction.

15. A motor generator set comprising a generator and a variable speed prime mover for operating the generator, a member movable in one direction to increase the speed of the prime mover, an electromagnet having a coil and having a movable core, means electrically connecting the coil in series with the output of the generator and load to establish a magnetic circuit through the core in dependence upon the electrical energy supplied to the load, a connection between the core and first named member effective to increase the speed of the prime mover in accordance with the movement of the core under the influence of the magnetic circuit, and a yieldable stop engageable with the first named member to resist movement thereof in a direction to increase the speed of the prime mover, said stop being spaced a predetermined distance from the first named member to provide a limited relatively free movement of the latter in a direction to increase the speed of the prime mover.

16. A motor generator set comprising a generator and a variable speed prime mover operatively connected to the generator, a member movable in one direction to increase the speed of the prime mover, means for moving said member in the direction aforesaid in response to variations in the demand of electrical energy at the load, and a spring influenced stop engageable with said member to yieldably resist movement thereof in a direction to increase the speed of the prime mover, said stop being spaced a predetermined distance from said member to provide a limited relatively free movement of the latter in a direction to increase the speed of the prime mover.

17. A motor generator set comprising a generator and a variable speed prime mover connected to the generator for operating the latter, a member movable in one direction to increase the speed of the prime mover, an electromagnet having a coil and having a movable core connected to said member, means connecting the coil in series with the load and with the output of the generator whereby the member is operated to increase the speed of the prime mover in dependence upon the demand for electrical energy at the load, a spring influenced stop engageable with said member to yieldably resist movement thereof in a direction to increase the speed of the prime mover, said stop being spaced a predetermined distance from said member to provide a limited relatively free movement of the latter in a direction to increase the speed of the prime mover, adjustable means for varying the degree of relatively free movement of the member to increase the speed of the prime mover, and additional adjustable means for varying the resistance offered by said stop.

LEE R. CAMPBELL.